United States Patent [19]

Cassetti

[11] Patent Number: 5,781,802
[45] Date of Patent: Jul. 14, 1998

[54] FIRST-IN-FIRST-OUT (FIFO) CONTROLLER FOR BUFFERING DATA BETWEEN SYSTEMS WHICH ARE ASYNCHRONOUS AND FREE OF FALSE FLAGS AND INTERNAL METASTABILITY

[75] Inventor: David K. Cassetti, Tempe, Ariz.

[73] Assignee: VLSI Technology, Inc., San Jose, Calif.

[21] Appl. No.: 890,127

[22] Filed: Jul. 9, 1997

Related U.S. Application Data

[63] Continuation of Ser. No. 383,384, Feb. 3, 1995, abandoned.

[51] Int. Cl.$^6$ .................................................. G06F 12/02
[52] U.S. Cl. ........................ 395/877; 395/876; 395/873; 395/309; 395/310; 395/552
[58] Field of Search ................................. 395/250, 309, 395/310, 552, 872, 873, 874, 875, 876, 877

[56] References Cited

U.S. PATENT DOCUMENTS

| | | | |
|---|---|---|---|
| 4,138,732 | 2/1979 | Suzuki et al. | 395/851 |
| 4,176,400 | 11/1979 | Heckel | 395/872 |
| 4,285,038 | 8/1981 | Suzuki et al. | 395/877 |
| 4,692,894 | 9/1987 | Bemis | 395/250 |
| 4,785,415 | 11/1988 | Karlquist | 395/552 |
| 5,027,326 | 6/1991 | Jones | 365/221 |
| 5,084,837 | 1/1992 | Matsumoto et al. | 395/250 |
| 5,345,419 | 9/1994 | Fenstermaker et al. | 365/189.04 |
| 5,471,583 | 11/1995 | Au et al. | 395/877 |
| 5,473,756 | 12/1995 | Traylor | 395/877 |
| 5,502,822 | 3/1996 | Takebe | 395/310 |
| 5,598,113 | 1/1997 | Jex et al. | 326/94 |
| 5,640,515 | 6/1997 | Park | 395/872 |

OTHER PUBLICATIONS

M. Morris Mano, Digital Design, [Prentice-Hall], pp. 175-179, 322-325 and 445-447, 1984.

*Primary Examiner*—Richard L. Ellis
*Assistant Examiner*—Gautam R. Patel
*Attorney, Agent, or Firm*—Harry M. Weiss; Jeffrey D. Moy; Harry M. Weiss & Associates, P.C.

[57] ABSTRACT

This is an improved FIFO controller which is capable of buffering data between systems which are asynchronous relative to one another and is free of false flags and internal metastability. The FIFO controller comprises a controller means for receiving read/write data strobes and for generating an initial read/write pointer and a next read/write pointer. Memory means are coupled to the controller means for storing the read/write pointer and read/write data information. Flag generation means are coupled to the controller means for computing a status of the FIFO flags and for preventing momentary false flags.

12 Claims, 1 Drawing Sheet

FIRST-IN-FIRST-OUT (FIFO) CONTROLLER FOR BUFFERING DATA BETWEEN SYSTEMS WHICH ARE ASYNCHRONOUS AND FREE OF FALSE FLAGS AND INTERNAL METASTABILITY

This is a continuation of application Ser. No. 08/383,384 filed on Feb. 3, 1995, now abandoned.

BACKGROUND OF THE INVENTION

1. Field of the Invention

This invention relates generally to a first-in-first-out (FIFO) controller and, more specifically, to a FIFO controller for buffering data between systems which are asynchronous and which is free of false flags and internal metastability and method therefor.

2. Description of the Prior Art

Current first-in-first-out (FIFO) controllers have a problem in trying to buffer data between systems which are asynchronous relative to one another. One solution to this problem is to operate the FIFO controller synchronously and synchronize the read and write strobes to the FIFO controller. The synchronizer must allow enough time to prevent meta-stable failure, thus lowering performance of the system, yet operate fast enough to meet throughput requirements. However, a problem arises under this solution since a synchronous clock of the desired frequency may not be available.

Another solution to the above problem is to use special timing generators to ensure that the FIFO flags remain latched until the new flags are evaluated in a one-shot or self-timed fashion. However, a problem also arises under this solution. Such circuit techniques may not be suitable for reusable blocks since circuit techniques are sensitive to process technology and circuit layout.

Therefore, a need existed to provide a FIFO controller which could buffer data between systems which were asynchronous and which would be free of false flags and internal metastability. The FIFO controller must also be suitable as a reusable circuit block and must not depend on a high frequency clock.

SUMMARY OF THE INVENTION

It is an object of the present invention to provide an improved FIFO controller and method therefor.

It is another object of the present invention to provide an improved FIFO controller and method therefor that is suitable as a reusable circuit block and does not depend on a high frequency clock.

It is still another object of the present invention to provide an improved FIFO controller and method therefor which is capable of buffering data between systems which are asynchronous and which is free of false flags and internal metastability.

BRIEF DESCRIPTION OF THE PREFERRED EMBODIMENT

In accordance with one embodiment of the present invention a FIFO controller for buffering data between asynchronous systems and which is free of false flags and internal metastability is disclosed. The FIFO controller comprises a controller means for receiving read/write data strobes and for generating an initial read/write pointer and a next read/write pointer. The initial read/write pointer and the next read/writ pointer are used to indicate a particular address in the memory. Memory means are coupled to the controller means for storing the read/write data information. Flag generation means are coupled to the controller means for computing a status of the FIFO flags and for preventing momentary false flags.

In accordance with another embodiment of the present invention a method of providing a FIFO controller for buffering data between systems which are asynchronous and which is free of false flags and internal metastability is disclosed. The method comprises the steps of providing controller means for receiving read/write data strobes and for generating an initial read/write pointer and a next read/write pointer, the read/write pointer and the next read/write pointer being used to indicate a particular address in the memory; providing memory means coupled to the controller means for storing the read/write data information; and providing flag generation means coupled to the controller means for computing a status of the first-in-first-out (FIFO) flags and for preventing momentary false flags.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENT

Figure 1:
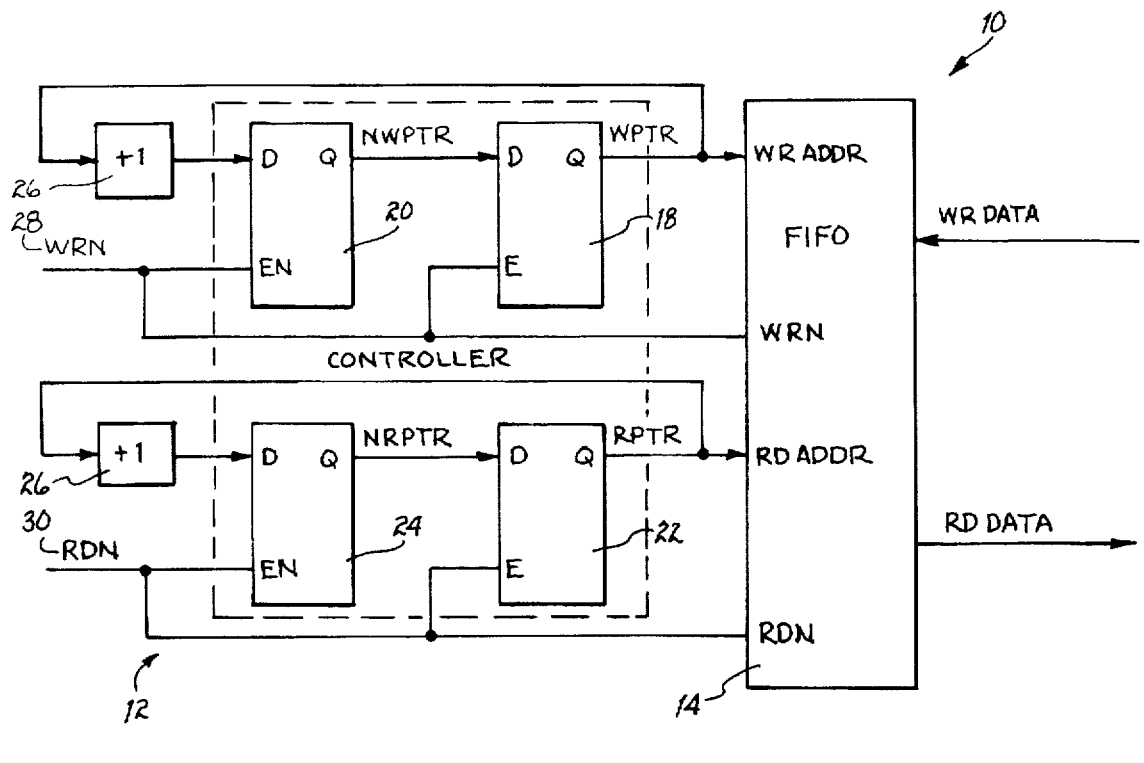
FIG. 1 shows a simplified block diagram of the FIFO controller of the present invention.
Figure 1:
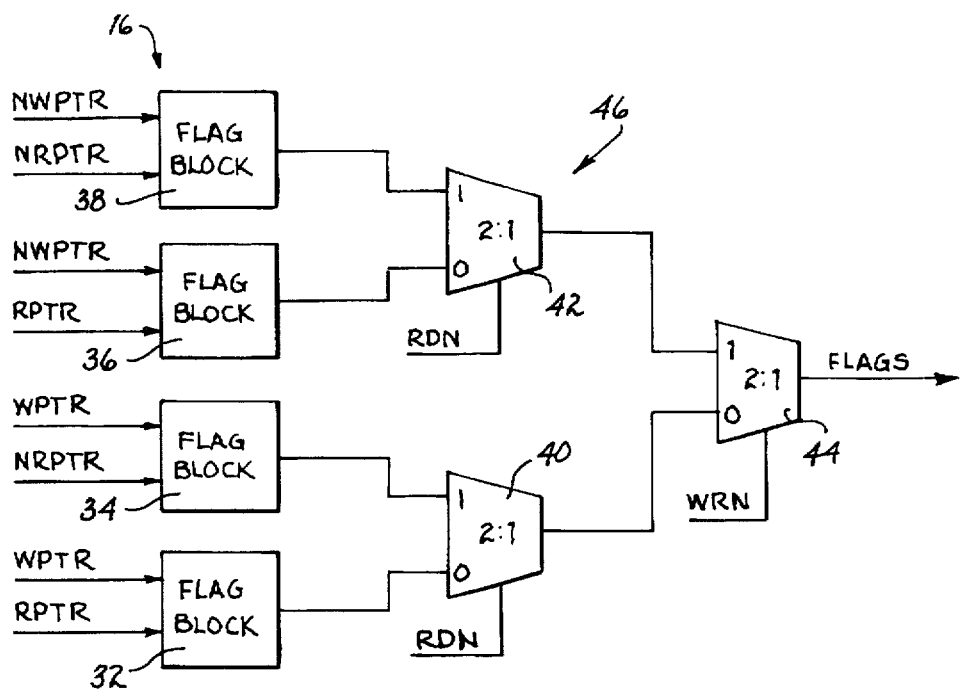

Referring to FIG. 1, a FIFO controller 10 is shown. The FIFO controller 10 is comprised of controller means 12, memory means 14, and flag generation means 16.

The controller means 12 of FIFO controller 10 could be described as comprising a read section and a write section. The write section of controller means 12 comprises a write pointer latch (WPTR) 18, a next write pointer latch 20 (NWPTR), and incrementer means 26. The write pointer latch 18 has an output which is coupled to the memory means 14 and to an input of the incrementer means 26. Next write pointer latch 20 has an input which is coupled to an output of the incrementer means 26, and an output which is coupled to an input of the write pointer latch 18. Write pointer latch 18 and next write pointer latch 20 are activated and deactivated by a signal from a write strobe (WRN) 28.

During the operation of the write section, when the FIFO controller 10 is reset, the write pointer latch 18 and the next write pointer latch 20 are cleared signifying an empty condition. The write pointer latch 18 generates an initial write pointer which signifies a particular address in the memory means 14. When the write strobe 28 becomes active, the write pointer latch becomes latched. The incrementer means 26 takes the write pointer and advances the write pointer by one position. The next write pointer latch 20 is then loaded with the next write pointer (write pointer +1). When the write strobe 28 returns to an inactive state, the memory write to the address indicated by the write pointer is complete and the next write pointer of the next write pointer latch 20 is transferred to the write pointer latch 18.

The read section of controller means 12 comprises a read pointer latch (RPTR) 22, a next read pointer latch (NRPTR) 24, and an incrementer means 26. The read pointer latch 22 has an output which is coupled to the memory means 14 and to an input of the incrementer means 26. The next read pointer latch 24 has an input which is coupled to an output of the incrementer means 26, and an output which is coupled to an input of read pointer latch 22. The read pointer latch 22 and the next read pointer latch 24 are activated and deactivated by a read strobe (RDN) 30.

The operation of the read section of the controller means 12 is analogous to the write section of the controller means 12. When the FIFO controller is reset, the read pointer latch 22 and the next read pointer latch 24 are cleared signifying an empty condition. The read pointer latch 22 generates an initial read pointer which indicates a particular address in the memory means 14. When the read strobe becomes active, the read pointer latch 22 becomes latched. The incrementer means 26 takes the read pointer and advances the read pointer by one position. The next read pointer latch 24 is then loaded with the next read pointer (read pointer +1). When the read strobe returns to an inactive state, the memory read to the address indicated by the read pointer is complete, and the next read pointer of the next read pointer latch 24 is transferred to the read pointer latch 22.

As stated above, the memory means 14 is coupled to the output of the write pointer latch 18 and to the output of the read pointer latch 22. The write strobe 28 and the read strobe 30 are also coupled to the memory means 14. The write strobe 28 and the read strobe 30 are used by the memory means 14 to determine when a write operation or when a read operation is in progress.

The write pointer latch 18 generates a write pointer which indicates a specific address in the memory means 14. The read pointer latch 22 generates a read pointer which indicates a specific address in the memory means 14. Memory means 14 is also used to store read and write data information that is written from or read to the system upon which the FIFO controller 10 is coupled to. Memory means 14 may be comprised of a dual-ported random access memory (RAM) device, a plurality of latches, or a plurality of flip-flops.

The flag generation means 16 comprises a first flag block 32, a second flag block 34, a third flag block 36, and a fourth flag block 38. Each of the respective flag blocks have an output which is coupled to an input of a 4:1 hazard free multiplexor 46 which is designed to be hazard free for any single select line change. The 4:1 hazard free multiplexor 46 has an output which is coupled to the FIFO flags. FIG. 1 shows one embodiment of the flag generation means 16 with the 4:1 hazard free multiplexor 46. In this embodiment, the first flag block 32 is coupled to the output of the write pointer latch 18 and to the output of the read pointer latch 22. The second flag block 34 is coupled to the output of the write pointer latch 18 and to the output of the next read pointer latch 24. The third flag block 36 is coupled to the output of the next write pointer latch 20 and to the output of the read pointer latch 22. The fourth flag block 38 is coupled to the output of the next write pointer latch 20 and to the output of the next read pointer latch 24. The 4:1 hazard free multiplexor 46 is implemented by using a plurality of 2:1 hazard free multiplexors. The first flag block 32 and the second flag block 34 each have an output which is coupled to a first 2:1 hazard free multiplexor 40. The third flag block 36 and the fourth flag block 38 each have an output which is coupled to a second 2:1 hazard free multiplexor 42. The outputs of the first 2:1 hazard free multiplexor 40 and the second 2:1 hazard free multiplexor 42 are coupled to a third 2:1 hazard free multiplexor 44. The output of the third 2:1 hazard free multiplexor 44 is coupled to the FIFO flags. The first 2:1 hazard free multiplexor 40 and the second hazard free multiplexor 42 are enabled by the read strobe 30, and that the third 2:1 hazard free multiplexor 44 is enabled by the write strobe 28. While FIG. 1 shows that the first hazard free multiplexor 40 and the second hazard free multiplexor 42 are enabled by the read strobe 30, and that the third 2:1 hazard free multiplexor 44 is enabled by the write strobe 28, it should be noted that the flag generation means 16 could be designed so as to have the first 2:1 hazard free multiplexor 40 and the second hazard free multiplexor 42 enabled by write strobe 28, and the third 2:1 hazard free multiplexor enabled by the read strobe 30. However, this configuration would require changing the inputs to the plurality of flag blocks.

In operation, the first flag block 32, the second flag block 34, the third flag block 36 and the fourth flag block 38 each compute a status of the FIFO flags (such as FULL, EMPTY, etc.) based on the particular read/write or next read/next write pointer latch input combination to each respective flag block. For each change of the read strobe 30 or write strobe 28, the newly selected flag block will have stabilized as long as minimum high/low times on the strobes are observed. The plurality of 2:1 hazard free multiplexors are used to prevent momentary false flags. The three 2:1 hazard free multiplexors form the 4:1 hazard free multiplexor 46 (one per flag bit) which is designed to be hazard free for any single select line change.

While the invention has been particularly shown and described with reference to preferred embodiments thereof, it will be understood by those skilled in the art that the foregoing and other changes in form and details may be made therein without departing from the spirit and scope of the invention.

I claim:

1. A first-in-first-out (FIFO) controller for buffering data between systems which are asynchronous and free of false flags and internal metastability comprising, in combination:

controller means for receiving read/write data strobe wherein said read/write data strobes are used to activate and deactivate said controller means and for generating an initial read/write pointer and a next read/write pointer, said initial read/write pointer and said next read/write pointer being used to indicate an address in memory means, wherein said controller means comprises:

a plurality of latch means for generating said initial read/write pointer and said next read/write pointer, said initial read/write pointer and said next read/write pointer being activated and deactivated by said read/write data strobes; and incrementer means coupled to said plurality of latch means for advancing said initial read/write pointer to said next read/write pointer;

memory means coupled to said controller means and which is activated and deactivated by said read/write data strobes for storing read/write data information when signaled by said read/write data strobes; and flag generation means coupled to said controller means and which is activated and deactivated by said read/write data strobes for computing a status of first-in-first-out (FIFO) flags and for preventing momentary false flags, wherein said flag generation means comprises:

a plurality of flag block means coupled to said initial read/write pointer and said next read/write pointer for computing the status of said FIFO flags; and multiplexor means which are activated by said read/write data strobes and are coupled to said plurality of flag block means for preventing said momentary false flags, wherein said multiplexor means comprises;

a first multiplexor coupled to said plurality of flag block means and which is activated by said read data strobe;

a second multiplexor coupled to said plurality of flag block means and which is activated by said read data strobe; and a third multiplexor coupled to an output of said first multiplexor and to an output of said second multiplexor and which is activated by said write data strobe.

2. A FIFO controller in accordance with claim 1 wherein said memory means comprises a dual port random access memory (RAM) device.

3. A FIFO controller in accordance with claim 1 wherein said memory means comprises a plurality of latches.

4. A FIFO controller in accordance with claim 1 wherein said memory means comprises a plurality of flip-flops.

5. A FIFO controller in accordance with claim 1 wherein said plurality of flag block means comprises:

a first flag block having a first input coupled to said read pointer and a second input coupled to said write pointer and an output coupled to said first multiplexor;

a second flag block having a first input coupled to said next read pointer and a second input coupled to said write pointer and an output coupled to said first multiplexor;

a third flag block having a first input coupled to said read pointer and a second input coupled to said next write pointer and an output coupled to said second multiplexor; and a fourth flag block having a first input coupled to said next read pointer and a second input coupled to said next write pointer and an output coupled to said second multiplexor.

6. A first-in-first-out (FIFO) controller for buffering data between systems which are asynchronous and free of false flags and internal metastability comprising, in combination:

a plurality of latch means for generating an initial read/write pointer and a next read/write pointer, said initial read/write pointer and said next read/write strobe being used to indicate an address in memory means, said initial read/write pointer and said next read/write pointer being activated and deactivated by said read/write data strobes;

incrementer means coupled to said plurality of latch means for advancing said read/write pointer to said next read/write pointer;

memory means coupled to said plurality of latch means and which is activated and deactivated by said read/write data strobes for storing read/write data information when signaled by said read/write data strobes;

a plurality of flag block means coupled to said initial read/write pointer and said next read/write pointer for computing a status of FIFO flags; and multiplexor means coupled to said plurality of flag block means and which are activated and deactivated by said read/write data strobes for preventing a momentary false flag signal comprising:

a first multiplexor coupled to said plurality of flag block means and which is activated by said read strobe;

a second multiplexor coupled to said plurality of flag block means and which is activated by said read strobe; and a third multiplexor coupled to an output of said first multiplexor and to an output of said second multiplexor and which is activated by said write strobe.

7. A FIFO controller in accordance with claim 6 wherein said plurality of flag block means comprises:

a first flag block having a first input coupled to said read pointer and a second input coupled to said write pointer and an output coupled to said first multiplexor;

a second flag block having a first input coupled to said next read pointer and a second input coupled to said write pointer and an output coupled to said first multiplexor;

a third flag block having a first input coupled to said read pointer and a second input coupled to said next write pointer and an output coupled to said second multiplexor; and a fourth flag block having a first input coupled to said next read pointer and a second input coupled to said next write pointer and an output coupled to said second multiplexor.

8. A method of providing a first-in-first-out (FIFO) controller for buffering data between systems which are asynchronous and free of false flags and internal metastability comprising the steps of:

providing controller means for receiving read/write data strobes wherein said read/write data strobes are used to activate and deactivate said controller means and for generating an initial read/write pointer and a next read/write pointer, said initial read/write pointer and said next read/write pointer being used to indicate an address in memory means, said step of providing controller means further comprising the steps of:

providing a plurality of latch means for generating said initial read/write pointer and said next read/write pointer; and providing incrementer means coupled to said plurality of latch means for advancing said initial read/write pointer to said next read/write pointer;

providing memory means coupled to said controller means and which is activated and deactivated by said read/write data strobes for storing read/write data information when signaled by said read/write data strobes; and providing flag generation means coupled to said controller means and which is activated and deactivated by said read/write data for computing a status of first-in-first-out (FIFO) flags and for preventing momentary false flags, wherein the step of providing flag generation means further comprises the steps of:

providing a plurality of flag block means coupled to said initial read/write pointer and said next read/write pointer for computing the status of said FIFO flags; and providing multiplexor means coupled to said plurality of flag block means and which are activated by said read/write data strobes for preventing said momentary false flags, wherein the step of providing multiplexor means coupled to said plurality of flag block means further comprises the steps of:

providing a first multiplexor coupled to said plurality of flag block means which is activated by said read data strobes;

providing a second multiplexor coupled to said plurality of flag block means which is activated by said read data strobes; and providing a third multiplexor coupled to an output of said first multiplexor and to an output of said second multiplexor which is activated by said write data strobes.

9. A method of providing a FIFO controller in accordance with claim 8 wherein the step of providing memory means comprises the step of providing a dual port random access memory (RAM) device.

10. A method of providing a FIFO controller in accordance with claim 8 wherein the step of providing memory means comprises the step of providing a plurality of latches.

11. A method of providing a FIFO controller in accordance with claim 8 wherein the step of providing memory means comprises the step of providing a plurality of flip-flops.

12. A method of providing a FIFO controller in accordance with claim 8 wherein said step of providing a plurality of flag block means further comprises the steps of:

providing a first flag block having a first input coupled to said read pointer and a second input coupled to said write pointer and an output coupled to said first multiplexor;

providing a second flag block having a first input coupled to said next read pointer and a second input coupled to said write pointer and an output coupled to said first multiplexor;

providing a third flag block having a first input coupled to said read pointer and a second input coupled to said next write pointer and an output coupled to said second multiplexor; and providing a fourth flag block having a first input coupled to said next read pointer and a second input coupled to said next write pointer and an output coupled to said second multiplexor.

\* \* \* \* \*